J. HENDY.
Concentrator.
No. 53,976.
Patented April 17, 1866.
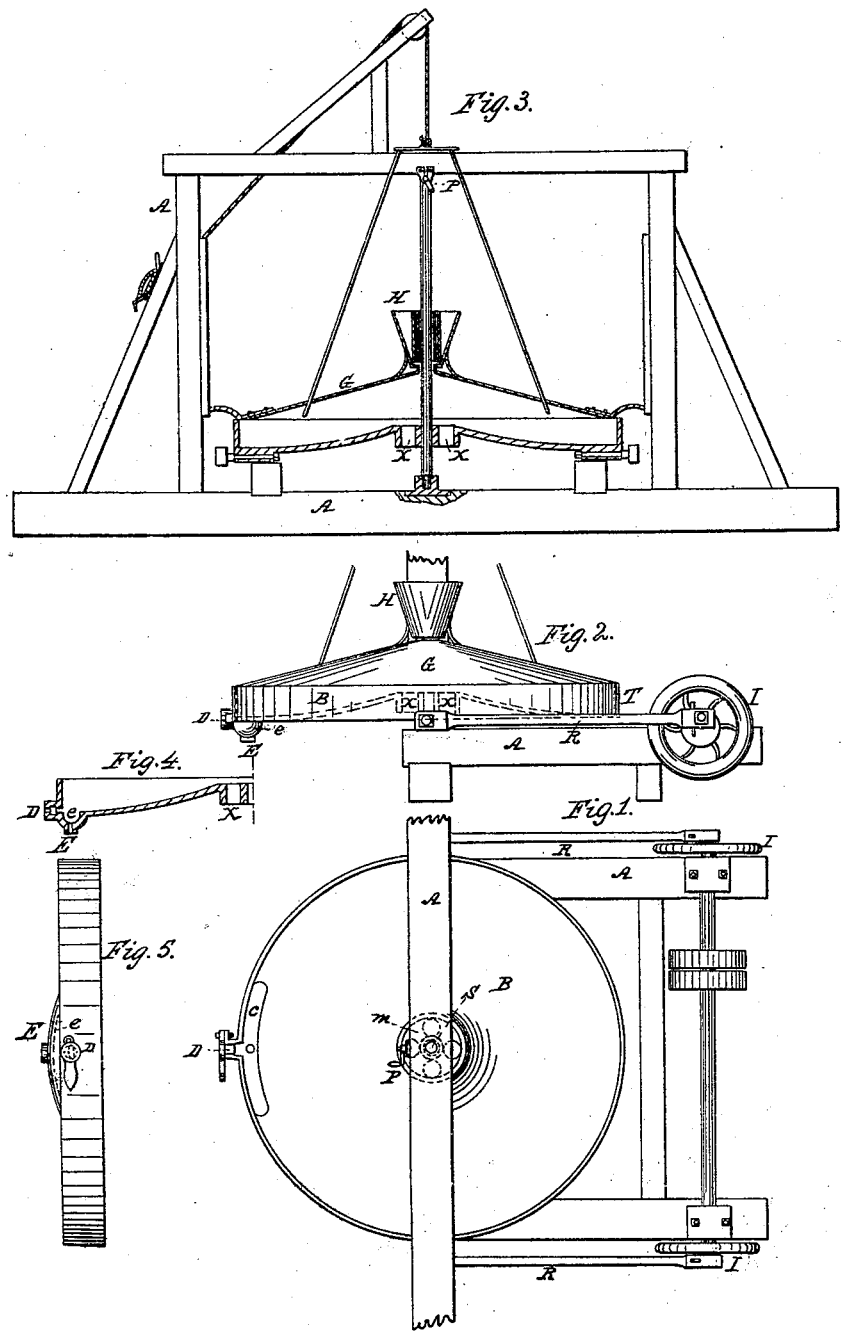
Witnesses:

UNITED STATES PATENT OFFICE.

JOSHUA HENDY, OF SAN FRANCISCO, CALIFORNIA.

IMPROVED CONCENTRATOR.

Specification forming part of Letters Patent No. 53,976, dated April 17, 1866.

*To all whom it may concern:*

Be it known that I, JOSHUA HENDY, of the city and county of San Francisco, State of California, have invented a new and Improved Concentrator; and I do hereby declare that the following is a full and exact description of the same, reference being had to the accompanying drawings, and to the letters of reference marked thereon.

The nature of my invention consists in an arrangement for discharging the sulphurets continuously or at intervals as frequent as may be desirable without stopping the machine.

Figure 1 is a top view of the pan. Fig. 2 is a side view. Fig. 3 is a cross vertical section from side to side. Fig. 4 is a section of a portion of the pan. Fig. 5 is a front view of the pan.

A is a frame-work of wood. B is an iron pan, with a curved bottom descending from or near its center to its periphery, and which bottom is slightly higher at the point opposite the outlet D, formed with a gradual inclination downward toward said outlet. The form of curve most desirable is one gradually diminishing from the center to the periphery, having its greatest inclination near the center.

C is a horn-shaped cavity or trough, opposite and in proximity to the outlet D, and having another outlet, E, from its bottom.

X X are outlets at the center of the pan. When the shaft S is perpendicular the center outlet-rim should be horizontal.

F is a step for the shaft S to work in, and is so arranged as to slide forward and back in the frame-work of the machine. The upper end of shaft S has a collar round it, to which is affixed a screw, $m$, and crank or nut $p$, by means of which the shaft is moved forward and back in a groove in frame A. (See Figs. 1 and 3.)

G is a convex distributer, of sheet-iron or other suitable material, with a collar at its center for shaft S to work through. This distributer is suspended over the top of the pan, as shown in Fig. 3, and is provided with a hopper, H.

R R are rods worked by cranks or eccentrics to give an oscillatory motion to the pan.

Operation: The tailings are conducted into the hopper H, and with water are distributed by the hood G to the inside of the pan at its periphery. The pan being horizontal, the inclination of the bottom from the point T downward to the outlet D gives a tendency of its contents toward said outlet. The oscillatory motion of the pan agitates said contents. The earthy and light particles pass through the central outlets, X X. The inclination of the curve of the bottom being greatest near its center throws the sulphurets and other heavy particles—such as amalgam, &c.—toward the periphery of the pan. The horn-shaped cavity or trough C catches the amalgam and operates upon it in the same manner as by the process known to miners as "horning."

The pan B can be inclined forward in the direction of the outlet D by bringing the top of the shaft S forward by means of the screw $m$ and crank or nut $p$, or their equivalent. The rods R R at the same time draw the lower part of the shaft and the step F in the opposite direction. The oscillatory motion of the pan may be continued with the same facility as when the pan was in a horizontal position. The position and motion of the pan when so inclined is similar to the operation of panning out by hand in use by miners.

When the pan is used in a horizontal position the outlet D may be kept more or less open, giving a continuous discharge or opened at such intervals as may be necessary. In cleaning up or washing out the pan should be inclined forward.

Having thus described my machine and its operation, what I claim as my invention, and for which I desire Letters Patent to issue, is—

1. The curved bottom of the pan having its greatest inclination near the central discharge, and gradually diminishing in inclination as it approaches the periphery of the pan, substantially as described, and for the uses and purposes hereinbefore set forth.

2. The pan with a regular or graduated curved bottom.

3. The pan with a bottom so constructed as to have a downward inclination toward the discharge D at its periphery, at the same time the rim of the central discharge shall be in a horizontal position, so that the discharge shall be uniform, substantially as described, and for the uses and purposes set forth.

4. The horn-shaped cavity or trough C, in combination with oscillatory pans or concentrators, as herein described.

5. The horn-shaped trough, in combination with pans or concentrators having curved or convex bottoms.

6. The shaft S, with screw $m$, and crank or nut $p$, and step F, or their equivalent, for the uses and purposes hereinbefore set forth.

7. The oscillatory pan with curved or convex bottom, horn-shaped cavity C, outlets X, D, and E, in combination with the adjustable shaft S, substantially as described, and for the uses and purposes as hereinbefore set forth.

JOSHUA HENDY.

Witnesses:
 CHAS. R. BOND,
 W. W. LAWTON.